United States Patent [19]

Naruoka et al.

[11] Patent Number: 4,830,517
[45] Date of Patent: May 16, 1989

[54] DEVICE FOR LOCKING ROTATION OF AN ECCENTRIC BEARING OF A COMPRESSION RATIO CHANGING DEVICE

[75] Inventors: Takao Naruoka, Mishima; Eiji Iwasaki, Susono, both of Japan

[73] Assignee: Toyota Jidosha Kabushiki Kaisha, Toyota, Japan

[21] Appl. No.: 200,892

[22] Filed: Jun. 1, 1988

[30] Foreign Application Priority Data

Jun. 1, 1987 [JP] Japan .......................... 62-083220[U]

[51] Int. Cl.⁴ ............................................. F16C 25/02
[52] U.S. Cl. ................................... 384/255; 384/373; 123/48 R
[58] Field of Search ............... 384/255, 377, 373, 391, 384/398, 397; 123/48 R, 48 B, 78 F Primary Examiner—Lenard A. Footland
Attorney, Agent, or Firm—Cushman, Darby & Cushman

[57] ABSTRACT

A device for locking rotation of an eccentric bearing used in a compression ratio changing device for an internal combustion engine where rotation of the eccentric bearing interposed between a connecting rod and a piston-pin changes the compression ratio. The device includes at least two groups of lock-pins, lock-pin holes formed in the connecting rod and lock holes formed in the eccentric bearing. The eccentric bearing is always locked in rotation relative to the connecting rod except when the compression ratio is exchanged. The locking of the rotation of the eccentric bearing suppresses slap noises of the piston and abrasion of the sliding surfaces of the device and improves durability of the compression ratio changing device.

18 Claims, 5 Drawing Sheets

DEVICE FOR LOCKING ROTATION OF AN ECCENTRIC BEARING OF A COMPRESSION RATIO CHANGING DEVICE

BACKGROUND OF THE INVENTION

1. Field of the Invention

The present invention relates to a device for locking rotation of an eccentric bearing used in a compression ratio changing device for an internal combustion engine. More particularly, the present invention relates to a device for locking the rotation of the eccentric bearing at every compression ratio except when the compression ratio is exchanged.

2. Description of the Prior Art

A compression ratio changing device using an eccentric bearing is generally known as taught by Japanese Utility Model Publications No. SHO 58-137832, No. SHO 61-198531, No. SHO 61-192533, and No. SHO 61-183433. As described therein, the eccentric bearing has a cylindrical outside surface and a cylindrical inside surface eccentric with respect to the outside surface, and the eccentric bearing is rotatably interposed between a connecting rod and a piston-pin extending through a small end hole of the connecting rod. The rotation of the eccentric bearing changes a relative position of a piston with respect to the connecting rod and, as a result, changes the compression ratio of the internal combustion engine. The rotation of the eccentric bearing relative to the connecting rod is locked/unlocked by moving a single lock-pin which is slidably interposed in a single lock-pin hole formed in the connecting rod into/from a single lock hole formed in the eccentric bearing in the radial direction of the small end hole of the connecting rod. The lock hole is formed in the eccentric bearing at such a position that the lock hole can receive one end portion of the lock-pin when the thickest wall portion of the eccentric bearing comes to its lowest position with respect to the rotational axis of the eccentric bearing.

When engine loads are low or medium and, accordingly, a high compression ratio is required, the lock-pin is biased toward the eccentric bearing by pressurized oil which is supplied to the lock-pin hole, and the lock-pin engages with the lock hole to lock the rotation of the eccentric bearing at a high compression ratio. On the other hand, when engine loads are high and, accordingly, a low compression ratio is required for the purpose of preventing knocking of the engine, the lock-pin is moved away from the eccentric bearing and disengages with the lock hole to unlock the rotation of the eccentric bearing. When unlocked, the eccentric bearing can rotate freely receiving moments which are produced by the loads from the piston and the arm of eccentricity of the eccentric bearing. The eccentric bearing naturally takes a low compression ratio position where the thinnest wall portion of the eccentric bearing comes to its lowest position with respect to the rotational axis of the eccentric bearing.

In such a compression ratio changing device where the low compression ratio is obtained through unlocking the rotation of the eccentric bearing, there are the following disadvantages:

Firstly, because the rotation of the eccentric bearing changes the sway-movement center of the piston relative to the connecting rod, the piston is liable to cause a slap movement with respect to a cylinder bore, and the slap noises become severe in the low compression ratio state.

Secondly, because the eccentric bearing continues to rotate at high speeds during the low compression ratio state, the lock-pin collides with the surface of the lock hole of the eccentric bearing at high speeds when the compression ratio is exchanged from the low compression ratio to a high compression ratio. This decreases the durability of the assembly of the lock-pin and the eccentric bearing.

Thirdly, because the eccentric bearing continues to rotate during the low compression ratio state, the sliding surfaces including the outside surface of the eccentric bearing and the inside surface of the small end hole of the connecting rod are liable to be severely abrased, and the rotation of the eccentric bearing is liable to be deteriorated.

OBJECTS AND SUMMARY OF THE INVENTION

An object of the present invention is to provide a device for locking rotation of an eccentric bearing used in a compression ratio changing device of an internal combustion engine where the eccentric bearing is locked in rotation relative to the connecting rod at every compression ratio except when the compression ratio is exchanged.

In accordance with the present invention, the above object can be achieved by a device for locking rotation of an eccentric bearing used in a compression ratio changing device for an internal combustion engine, the eccentric bearing having a cylindrical outside surface and a cylindrical inside surface eccentric with respect to the outside surface, the eccentric bearing being rotatably interposed between a connecting rod and a piston-pin extending through a small end hole of the connecting rod so that rotation of the eccentric bearing changes a relative position of a piston with respect to the connecting rod to change a compression ratio of the internal combustion engine, the device comprising:

a plurality of lock-pins, a plurality of lock-pin holes defined in the connecting rod for slidably housing the lock-pins, and a plurality of lock-holes defined in the eccentric bearing for engaging with one end portion of the lock-pins, engagement of the lock-pins with the lock holes locking a relative rotation of the eccentric bearing with respect to the connecting rod at respective locking positions in a rotational direction of the eccentric bearing, the lock-pins, the lock-pin holes and the lock holes being grouped into at least two groups each of which is composed of one lock-pin, one lock-pin hole and one lock hole and has one locking position, the locking positions of at least two groups among the at least two groups being offset from each other in the rotational direction of the eccentric bearing;

at least one connecting oil groove, defined in the eccentric bearing, for fluidly connecting the lock holes; and at least two oil paths, defined in the connecting rod and fluidly connected to the lock-pin holes, for supplying and draining a pressurized oil to and from the lock-pin holes, at least one oil path among the at least two oil paths being maintained to be pressurized, and at least one remaining oil path among the at least two oil paths being maintained to be drained when engine loads are maintained at either one of high, intermediate and low loads, pressurizing and draining of the oil paths being exchanged when the engine loads change from one load to another load.

In the above device, one lock-pin biased by the pressurized oil is brought into engagement with the lock hole grouped in the same group as the biased lock-pin, and the rotation of the eccentric bearing is locked at the locking position defined to the group. Relative rotation of the eccentric bearing continues to be locked up to the time when the engine loads change from one to another of high, intermediate and low loads. Then, the rotation of the eccentric bearing relative to the connecting rod is locked at every compression ratio state except when the compression ratio is exchanged.

BRIEF DESCRIPTION OF THE DRAWINGS

These and other objects and advantages of the present invention will become apparent from the following detailed description of the presently preferred exemplary embodiments of the invention taken in conjunction with the accompanying drawings, wherein.

DETAILED DESCRIPTION OF THE PREFERRED EMBODIMENTS OF THE PRESENT INVENTION

Firstly, structures common to the various embodiments of the present invention will be explained referring to, for example, FIGS. 1-5, which correspond to the first embodiment.

A compression ratio changing device for an internal combustion engine in accordance with the present invention includes an eccentric bearing 12 having a cylindrical outside surface 14 and a cylindrical inside surface 16 eccentric with respect to outside surface 14. Eccentric bearing 12 is rotatably interposed between a connecting rod 2 and a piston-pin 10 extending through a small end hole 4 of connecting rod 2 so that the rotation of eccentric bearing 12 changes a relative position of a piston with respect to connecting rod 2 to thereby change the compression ratio of the internal combustion engine. A device for locking rotation of eccentric bearing 12 includes a plurality of lock-pins 22 and 24, a plurality of lock-pin holes 6 and 8, a plurality of lock holes 18 and 20, at least one connecting oil groove 30, 32, and at least two oil paths 26 and 28. Lock-pin holes 6 and 8 are defined in connecting rod 2 for slidably housing lock-pins 22 and 24, respectively. Lock holes 18 and 20 are defined in eccentric bearing 12 for engaging with one end portion of lock-pins 22 and 24, respectively. The engagement of lock-pins 22 and 24 with lock holes 18 and 20, respectively, locks a relative rotation of eccentric bearing 12 with respect to connecting rod 2 at respective locking positions in the rotational direction of eccentric bearing 12. Lock-pins 22 and 24, lock-pin holes 6 and 8 and lock holes 18 and 20 are grouped into at least two groups each of which is composed of one lock-pin, one lock-pin hole and one lock hole and has one locking position. For example, lock-pin 22, lock-pin hole 6 and lock hole 18 compose one group where the locking position of the one group is determined by the dispositional relationship between lock-pin hole 6 and lock hole 18, and lock-pin 24, lock-pin hole 8 and lock hole 20 compose another group. The locking positions of at least two groups among the groups (which may include three groups as shown in FIGS. 6-11 as will be described hereafter) are offset from each other in the rotational direction of eccentric bearing 12.

At least one connecting oil groove 30, 32 is defined in eccentric bearing 12 for fluidly connecting lock holes 18 and 20. Oil paths 26 and 28, which are provided at least two in number, are defined in connecting rod 2 and are fluidly connected to lock-pin holes 6 and 8, respectively, and supply and drain a pressurized oil to and from lock-pin holes 6 and 8. In an engine having loads among high, intermediate and low loads, at least one oil path (for example, 26) is maintained to be pressurized while the remaining oil paths (for example, 28) are maintained to be drained. When the engine loads change from one load to another load, pressurizing and draining of oil paths 26 and 28 are exchanged. The pressurizing and draining circuit will be explained hereafter.

Preferably, the locking positions of the at least two groups include (a) a high compression ratio position where a thickest wall portion 12A of eccentric bearing 12 is positioned at its lowest position with respect to a rotational axis of eccentric bearing 12 and (b) a low compression ratio position where a thinnest wall portion 12B of eccentric bearing 12 is positioned at its lowest position with respect to the rotational axis of eccentric bearing 12.

The groups each have one guide groove 30 or 32. For example, in the first embodiment where the number of the groups is two, one group has guide groove 30 and the other group has guide groove 32. Guide grooves 30 and 32 are defined in a radially outer portion of eccentric bearing 12 and open at outside surface 14 of eccentric bearing 12. Guide grooves 30 and 32 initiate at lock holes 18 and 20, respectively, and extend away from lock holes 18 and 20, respectively, in the circumferential direction of eccentric bearing 12. Guide grooves 30 and 32 operate as at least one portion of connecting oil groove 30, 32 as well as operate as a groove for guiding lock-pins 22 and 24 to lock holes 18 and 20 when eccentric bearing 12 rotates.

Figure 12:
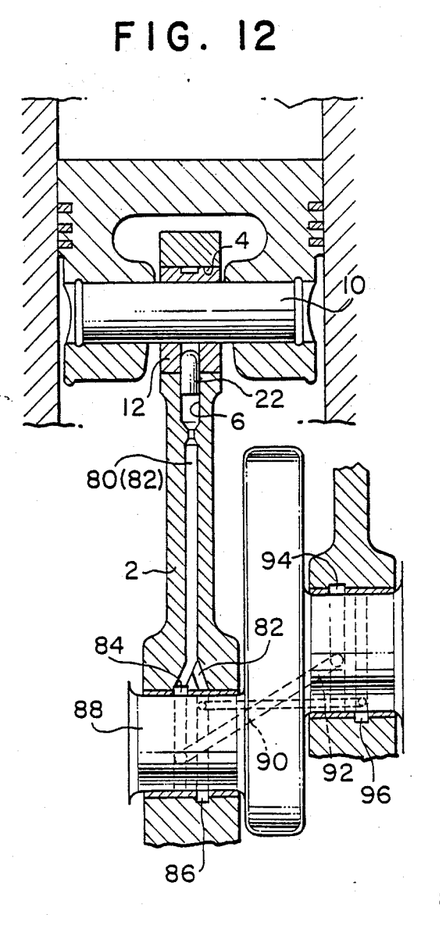
FIG. 12 an oil supply and drain device to which the devices for locking rotation of the eccentric bearing according to the various embodiments of the present invention are connected.
Figure 13:
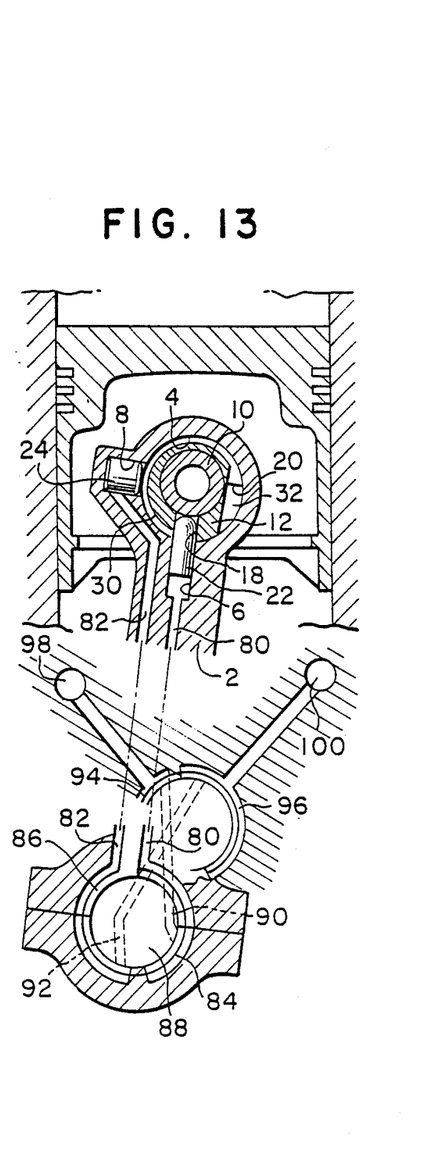
FIG. 13 is a transverse sectional view of the device of FIG. 12.
Figure 14:
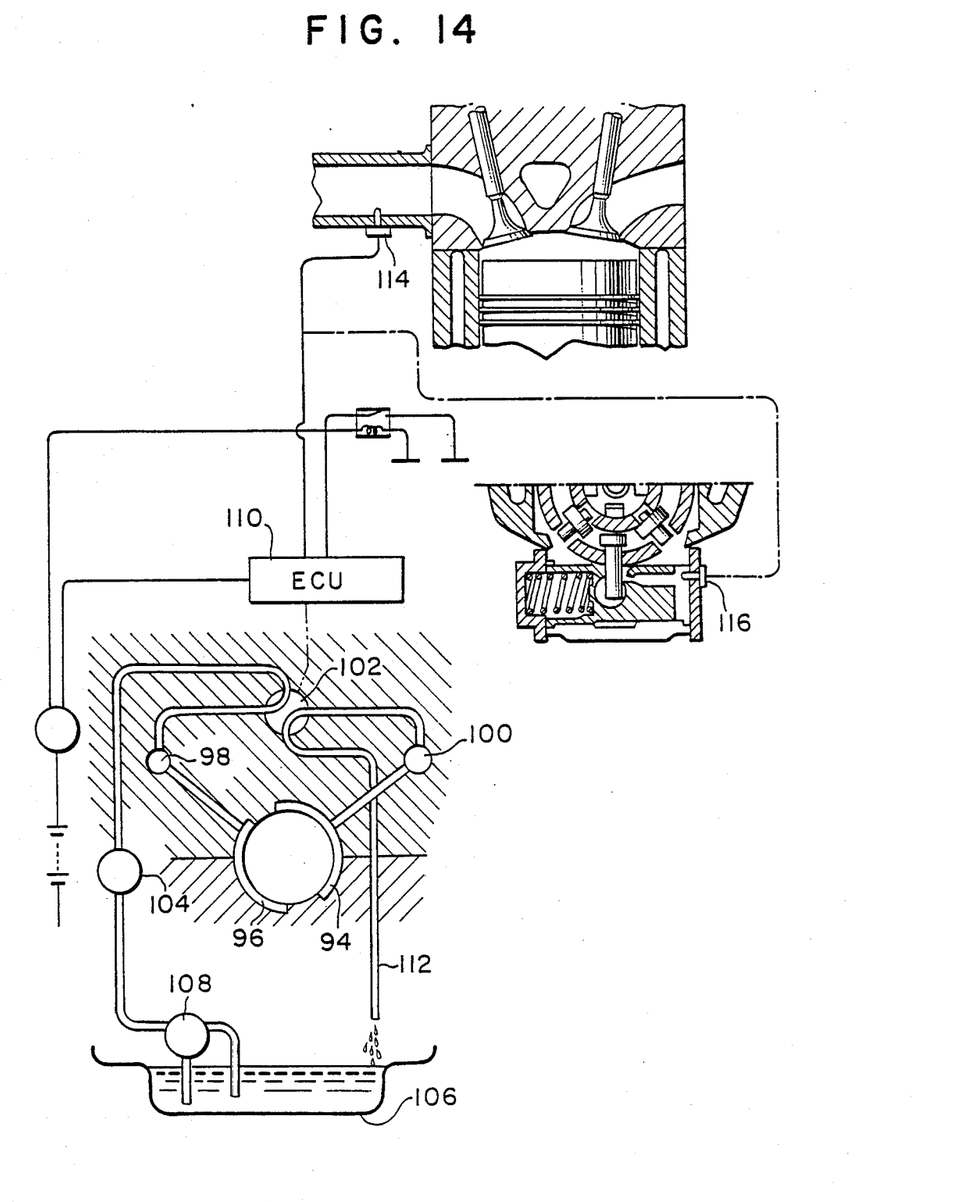
FIG. 14 is a diagram of an oil circuit connected to the devices of FIGS. 12 and 13.

As shown in FIGS. 12–14, oil paths 80 and 82, which correspond to oil paths 26 and 28, respectively, in the first and second embodiments and correspond to oil paths 66, 68, 70, 72 (which will be described later) in the third embodiment, are fluidly connected to oil grooves 84 and 86 which are formed independent of each other on a bearing portion of a large end portion of connecting rod 2. Oil grooves 84 and 86 are fluidly connected to oil grooves 94 and 96, independent of each other, formed in a bearing portion for supporting a crankshaft 88 via oil holes 90 and 92 formed in crankshaft 88, respectively. Oil grooves 94 and 96 are fluidly connected to pressure chambers 100 and 98, respectively. When oil grooves 84 and 86 are positioned in a single plane perpendicular to the axis of crankshaft 88 and oil grooves 94 and 96 are positioned in another single plane perpendicular to the axis of crankshaft 88, the oil hole to be formed in crankshaft 88 can be one in number, that is, one of oil holes 90 and 92 can be deleted, and in such a case the pressurizing and draining of oil paths 80 and 82 are done intermittently.

Oil which is supplied from an oil pan 106 and which is pressurize by an oil pump 108 is supplied via a main oil hole 104 formed in a cylinder block of the engine and a valve 102 to chambers 98 and 100. Valve 102 exchanges the supply of the pressurized oil from chamber 98 to chamber 100 and from chamber 100 to chamber 98. When one of chambers 98 and 100 is pressurized, the other of chambers 98 and 100 is drained through a drain pipe 112. The exchange of valve 102 is controlled by an engine control computer 110 to which engine operating condition signals are electrically sent. The engine operating condition signals include a signal from a sensor 114 for sensing a negative pressure of an intake manifold in the case of a gasoline engine and include a signal from a sensor 116 for sensing a fuel pressure of an outlet of a fuel pump in the case of a diesel engine.

Next, the different structures among the embodiments will be explained.

FIGS. 1–5 illustrate a first embodiment of the present invention. In the device according to the first embodiment, the number of the groups is two, that is, the lock-pins, the lock-pin holes, the lock holes and the guide grooves are each provided by twos in number. Axes of lock-pins 22 and 24, axes of lock-pin holes 6 and 8, axes of lock holes 18 and 20 and axes of guide grooves 30 and 32 are included in a single common plane perpendicular to the axis of small end hole 4 of connecting rod 2. Lock-pin holes 6 and 8 are offset from each other in a circumferential direction of small end hole 4 of connecting rod 2. Diameters of lock-pins 22 and 24, lock-pin holes 6 and 8 and lock holes 18 and 20 and widths of guide grooves 30 and 32 are determined such that those of one of the two groups are different in dimension from those of the other of the two groups. Because of such different dimensions, lock-pin 22 having a smaller diameter lets lock hole 20 having a larger diameter pass through lock-pin 22 when eccentric bearing 12 rotates and does not engages with lock hole 20, and lock-pin 22 can only engage with lock hole 18 having a smaller diameter Also, lock-pin 24 having a larger diameter can not enter lock hole 18 having a smaller diameter when eccentric bearing 12 rotates and engages with only lock hole 20 having a larger diameter.

One of lock-pin holes 6 and 8 extends perpendicularly to the other of lock-pin holes 6 and 8. More particularly, lock-pin hole 6 extends in the axial direction of connecting rod 2 and lock-pin hole 8 extends perpendicularly to the axis of the connecting rod 2. One of lock holes 18 and 20 is positioned at the thickest wall portion 12A of eccentric bearing 12 while the other of lock holes 18 and 20 is positioned at an intermediate thickness wall portion 12C of eccentric bearing 12 in a circumferential direction of eccentric bearing 12. This arrangement defines two locking positions which include (a) a high compression ratio position where the thickest wall portion 12A is positioned at its lowest position with respect to the rotational axis of eccentric bearing 12 and where eccentric bearing 12 is locked through the engagement of lock-pin 22 with lock hole 18 and (b) a low compression ratio position where a thinnest wall portion 12B is positioned at its lowest position with respect to the rotational axis of eccentric bearing 12 and where eccentric bearing 12 is locked through the engagement of lock-pin 24 with lock hole 20.

Guide groove 30, having a width smaller than the width of guide groove 32, extends between two lock holes 6 and 8 in the circumferential, rotational direction of eccentric bearing 12 and has a constant width over its entire length. This groove structure enables lock-pin 22 to pass through lock hole 20 when eccentric bearing 12 rotates in its rotational direction.

Figure 1:
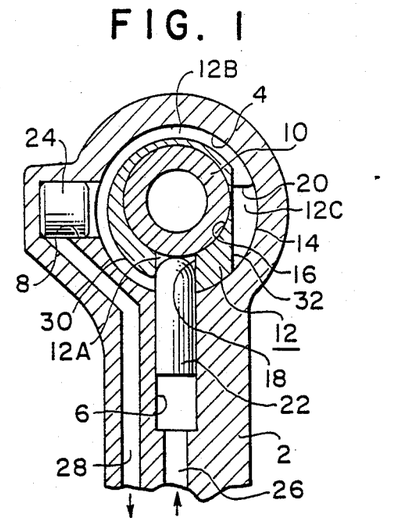
FIG. 1 is a sectional view of a device for locking rotation of an eccentric bearing in accordance with a first embodiment of the present invention where the eccentric bearing is locked at a high compression ratio position.
Figure 2:
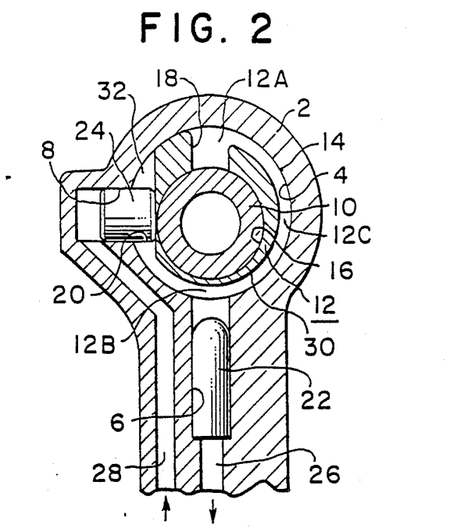
FIG. 2 is a sectional view of the device of FIG. 1 where the eccentric bearing is locked at a low compression ratio position.
Figure 3:
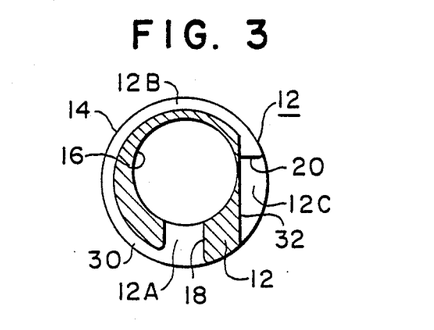
FIG. 3 is a sectional view of the eccentric bearing of FIG. 1.
Figure 4:
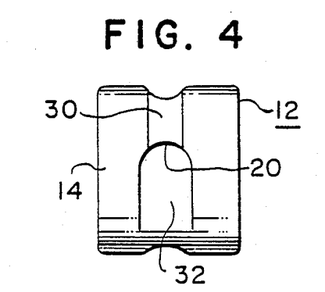
FIG. 4 is an elevational view of the eccentric bearing of FIG. 3.
Figure 5:
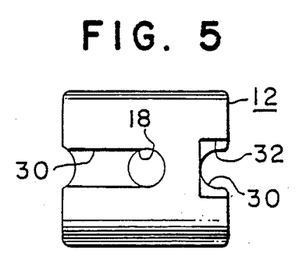
FIG. 5 is a bottom view of the eccentric bearing of FIG. 3.
Figure 6:
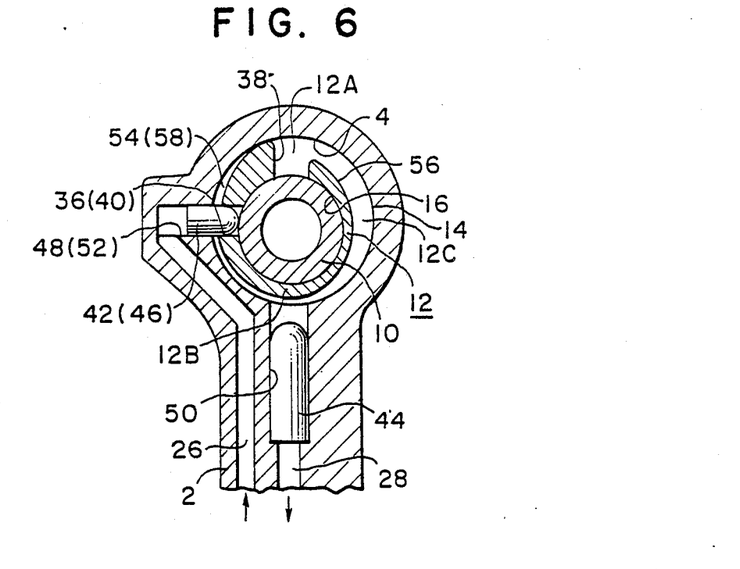
FIG. 6 is a sectional view of a device for locking rotation of an eccentric bearing in accordance with a second embodiment of the present invention.
Figure 7:
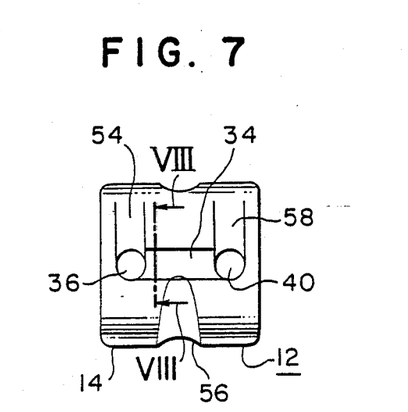
FIG. 7 is an elevational view of the eccentric bearing of FIG. 6.
Figure 8:
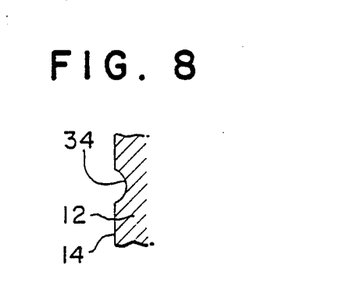
FIG. 8 is a sectional view of a portion of the eccentric bearing of FIG. 7 taken along line VIII—VIII in FIG. 7.

FIGS. 6–8 illustrate a second embodiment of the present invention. In the second embodiment, the number of the groups is three where the lock-pins, the lock-pin holes, the lock holes and the guide grooves are each provided by threes in number. Lock-pins 42, 44 and 46, lock-pin holes 48, 50 and 52, lock holes 36, 38 and 40 and guide grooves 54, 56 and 58 are included in planes perpendicular to the axis of small end hole 4 of connecting rod 2 such that axes of one lock-pin, one lock-pin hole, one lock hole and one guide groove grouped in one of the groups are included in one common plane such that one plane corresponding to one group is offset from another plane corresponding to another group in the axial direction of small end hole 4 of connecting rod 2. More particularly, the axes of lock-pin 42, lock-pin hole 48, lock hole 36 and guide groove 54 are included in one plane perpendicular to the axis of small end hole 4; the axes of lock-pin 44, lock-pin hole 50, lock hole 38 and guide groove 56 are included in another plane perpendicular to the axis of small end hole 4; and the axes of lock-pin 46, lock-pin hole 52, lock hole 40 and guide groove 58 are included in a third plane perpendicular to the axis of small end hole 4. The three planes are offset from each other in the axial direction of small end hole 4.

Axes of two lock-pin holes 48 and 52 among the three lock-pin holes are included in a common plane including the axis of small end hole 4 of connecting rod 2, and a third lock-pin hole 50 among the three lock-pin holes extends perpendicularly to the two lock-pin holes 48 and 52. Axes of two lock holes 36 and 40 among the three lock holes are included in a common plane including the axis of eccentric bearing 12 and a third lock hole 38 among the three lock holes extends perpendicularly to the two lock holes 36 and 40. The third lock hole 38 is positioned at the thickest wall portion 12A of eccentric bearing 12, and the two lock holes 36 and 40 having their axes included in the common plane including the axis of eccentric bearing 12 are positioned at the intermediate thickness wall portion 12C of eccentric bearing 12. This arrangement provides two locking positions of high and low compression ratio positions.

The connecting groove includes an axially extending groove 34 which extends between the two lock holes 36 and 40 having their axes included in the common plane including the axis of eccentric bearing 12. Guide groove 56 initiating at the third lock hole 38 is fluidly connected to axially extending groove 34.

Figures 9, 10, 11:
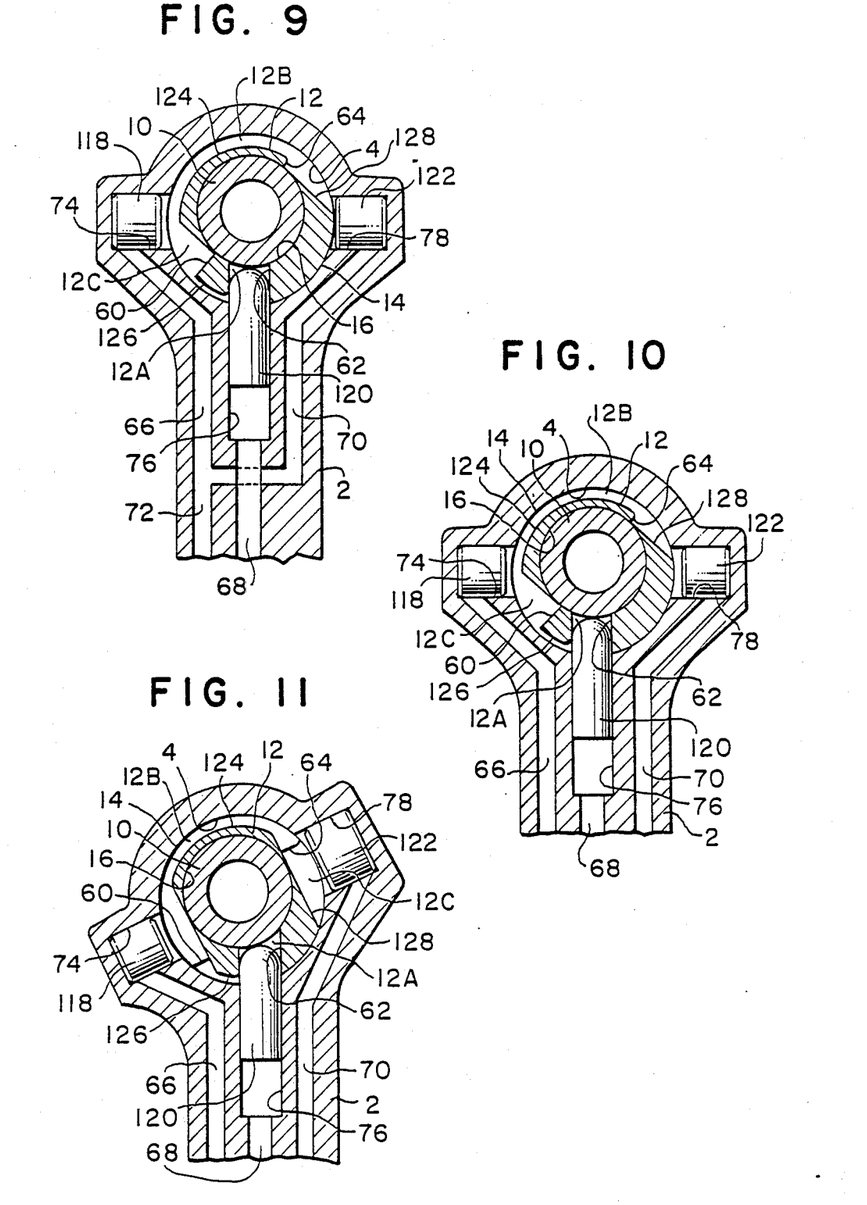
FIG. 9 is a sectional view of a device for locking rotation of an eccentric bearing in accordance with a first example of a third embodiment of the present invention.
FIG. 10 is a sectional view of a device for locking rotation of the eccentric bearing in accordance with a second example of the third embodiment of the present invention.
FIG. 11 is a sectional view of a device for locking rotation of the eccentric bearing in accordance with a third example of the third embodiment of the present invention.

FIGS. 9, 10 and 11 illustrate a third embodiment of the present invention. The third embodiment includes three examples, that is, a first example of FIG. 9, a second example of FIG. 10 and a third example of FIG. 11. In the third embodiment, the number of the groups is three where three lock-pins 118, 120 and 122, three lock-pin holes 74, 76 and 78, three lock holes 60, 62 and 64, and three guide grooves 124, 126 and 128 are provided. Axes of lock-pins 118, 120 and 122, axes of lock-pin holes 74, 76 and 78, axes of lock holes 60, 62 and 64 and axes of guide grooves 124, 126 and 128 are included in a single common plane perpendicular to the axis of small end hole 4 of connecting rod 2. Lock-pin holes 74, 76 and 78 are offset from each other in a circumferential direction of small end hole 4 of connecting rod 2. Diameters of lock-pins 118, 120 and 122, lock-pin holes 74, 76 and 78 and lock holes 60, 62 and 64 and widths of the guide grooves 124, 126 and 128 are determined such that those of one group among the three groups are different in dimension from those of the remaining two groups among the three groups.

In the first and second examples of the third embodiment, as respectively shown in FIGS. 9 and 10, the diameters of one lock-pin 118, one lock-pin hole 74 and one lock hole 60 and the width of one guide groove 124 of one group of the remaining two groups are the same in dimension as the diameters of the other lock-pin 122, lock-pin hole 78 and lock hole 64 and the width of the other guide groove 128 of the other group of the remaining two groups.

In the first and second examples of the third embodiment, lock-pin hole 76 among the three lock-pin holes extends in the axial direction of connecting rod 2, lock-pin hole 74 among the three lock-pin holes extends perpendicularly to the axis of connecting rod 2, and lock-pin hole 78 among the three lock-pin holes extends in the direction perpendicular to the axis of connecting rod 2 and opposite to the lock-pin hole 74. One lock hole 62 among the three lock holes is positioned at thickest wall portion 12A of eccentric bearing 12, and another lock hole 60 among the three lock holes is offset from the lock hole 62 in the circumferential direction of eccentric bearing 2. Lock hole 64 among the three lock holes is positioned diametrically opposite to the lock hole 60. This arrangement provides two locking positions of a high compression ratio position and an intermediate compression ratio position.

In the first example of the third embodiment, as shown in FIG. 9, there are three oil paths 66, 68 and 70 defined in connecting rod 2 and fluidly connected to lock-pin holes 76, 78 and 74, respectively. The two oil paths 66 and 70 fluidly connected to lock-pin holes 74 and 78 grouped in the remaining two groups are formed partially in common in connecting rod 2 to form a common oil path 72.

In the second example of the third embodiment, as shown in FIG. 10, oil paths 66 and 70 defined in connecting rod 2 and fluidly connected to lock-pin holes 74 and 78 grouped in the remaining two groups are formed independent of each other in connecting rod 2. When three independent oil paths are provided as shown, oil supply or drain paths 80, 82, oil grooves 84, 86, oil holes 90, 92, oil grooves 94, 96, pressure chambers 98, 100 shown in FIGS. 12–14 are preferably provided by threes in number each such that they are independent of each other.

In the third example of the third embodiment, as shown in FIG. 11, the diameters of one lock-pin 118, one lock-pin hole 74 and one lock hole 60 and the width of one guide groove 124 of one group of the remaining two groups are different in dimension from the diameters of the other lock-pin 122, lock-pin hole 78 and lock hole 64 and the width of the other guide groove 128 of the other group of the remaining two groups. One lock-pin hole 76 among the three lock-pin holes extends in the axial direction of connecting rod 2, another lock-pin hole 74 among the three lock-pin holes extends obliquely to the axis of connecting rod 2, and a third lock-pin hole 78 among the three lock-pin holes extends in the direction oblique to the axis of connecting rod 2 and opposite to the other lock-pin hole 74. One lock hole 62 among the three lock holes is positioned at the thickest wall portion 12A of eccentric bearing 12, and the other lock hole 60 among the three lock holes is offset from the lock hole 60 in the circumferential direction of eccentric bearing 12. Third lock hole 78 among the three lock holes is positioned diametrically opposite to the other lock hole 74. This arrangement provides three locking positions including a high compression ratio position and two intermediate compression ratio positions. In the third example of the third embodiment, three oil paths 66, 68 and 70 are defined in connecting rod 2, and oil paths 66, 68 and 70 are independent of each other in connecting rod 2.

Next, operation of the embodiments of the present invention will be explained.

In the device of the first embodiment, when engine loads are low or intermediate, lock-pin 22 continues to be biased toward eccentric bearing 12 by the pressurized oil supplied to lock-pin hole 6 through oil path 26 and continues to engage with lock hole 18 formed in the thickest wall portion 12A of eccentric bearing 12 to lock the rotation of eccentric bearing 12 relative to connecting rod 2. Since the thickest portion 12A of eccentric bearing 12 is positioned at its lowest position with respect to the axis of eccentric bearing 12, a high compression ratio state is maintained. When the engine loads change from low to high loads, pressurization of the oil paths is exchanged from oil path 26 to oil path 28. When oil path 28 is pressurized and oil path 26 is drained, lock-pin 24 is biased toward the eccentric bearing and the oil housed in guide grooves 30 and 22 is moved to bias lock-pin 22 away from lock hole 18 into lock-pin hole 6. When lock-pin 22 disengages with lock hole 18, eccentric bearing 12 begins to rotate relative to connecting rod 2. Lock-pin 24 biased toward eccentric bearing 12 slides on outer surface 14 of eccentric bearing 12, gets into guide groove 32 and slides on the bottom surface of guide groove 32 before being finally brought into engagement with lock hole 20. In this instance, lock-pin 24 does not engage with lock hole 18 because of the difference of the diameters. As a result, the compression ratio state is exchanged to a low one. When engine loads are high, however, lock-pin 24 continues to be biased toward eccentric bearing 12 by the pressurized oil supplied to lock-pin hole 8 through oil path 28 and continues to engage with lock hole 20. Since the thinnest wall portion 12B of eccentric bearing 12 is positioned at its lowest position with respect to the axis of eccentric bearing 12, a low compression ratio state is maintained. In the exchange from a low compression ratio to a high compression ratio, similarly to the exchange from the high compression ratio to the low compression ratio described above, lock-pin 22 does not engage with lock hole 20 and lets lock hole 20 pass through lock-pin 22 because of the dimension differences. The compression ratio is fixed at either a high one or a low one except when the compression ratio is exchanged.

In the second embodiment, two lock-pins 42 and 46 among the three lock-pins engage and disengage with lock holes 36 and 40, respectively, at the same time. In the exchange of the compression ratio, axially extending groove 34 sends the oil filled in the connecting groove including the guide grooves from one lock-pin grouped in one group to another lock-pin grouped in another group to move the other lock-pin away from the lock hole corresponding to the other lock-pin. The compression ratio is fixed at either a high one or a low one except when the compression ratio is exchanged.

In the first and second examples of the third embodiment, two lock-pins 118 and 122 among the three lock-pins engage and disengage with lock holes 74 and 78, respectively, at the same time. The compression ratio is fixed at either a high one or an intermediate one except when the compression ratio is exchanged. In the third example of the third embodiment, on the other hand, the three lock-pins 118, 120 and 122 are moved independently of each other and a selective one of them is brought into engagement with the corresponding lock hole. The compression ratio is fixed at either one of a high one and two intermediate ones except when the compression ratio is exchanged.

According to the present invention, the following effects are obtained:

Because eccentric bearing 12 is locked in rotation relative to connecting rod 2 at every compression ratio state except when the compression ratio is exchanged, piston slap noises are decreased.

Because eccentric bearing 12 is locked in rotation except when the compression ratio is exchanged, the rotational speeds of eccentric bearing 12 during the exchange of the compression ratio are slow and jumping of the lock-pin over the corresponding lock hole is prevented, which raises reliability of the exchanging operation.

Because the rotational speeds of eccentric bearing 12 are not high during the exchange of the compression ratio, collision between the lock-pin and the corresponding lock hole is not severe, which raises durability of the lock pin and eccentric bearing 12.

Because the relative rotation of eccentric bearing 12 with respect to connecting rod 2 occurs only at the time of exchanging of the compression ratio, abrasion of outside surface 14 of eccentric bearing 12 and the inside surface of small end hole 4 of connecting rod 2 is suppressed, which raises the reliability of smooth rotation of eccentric bearing 12 and the durability of eccentric bearing 12.

Although several preferred embodiments of the present invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A device for locking rotation of an eccentric bearing used in a compression ratio changing device for an internal combustion engine, the eccentric bearing having a cylindrical outside surface and a cylindrical inside surface eccentric with respect to the outside surface, the eccentric bearing being rotatably interposed between a connecting rod and a piston-pin extending through a small end hole of the connecting rod so that rotation of the eccentric bearing changes a relative position of a piston with respect to the connecting rod to change a compression ratio of the internal combustion engine, the device comprising:

a plurality of lock-pins, a plurality of lock-pin holes defined in the connecting rod for slidably housing the lock-pins, and a plurality of lock holes defined in the eccentric bearing for engaging with one end portion of the lock-pins, engagement of the lock-pins with the lock holes locking a relative rotation of the eccentric bearing with respect to the connecting rod at respective locking positions in a rotational direction of the eccentric bearing, the lock-pins, the lock-pin holes and the lock holes being grouped into at least two groups each of which is composed of one lock-pin, one lock-pin hole and one lock hole and has one locking position, the locking positions of at least two groups among the at least two groups being offset from each other in the rotational direction of the eccentric bearing;

at least one connecting oil groove, defined in the eccentric bearing, for fluidly connecting the lock holes; and at least two oil paths, defined in the connecting rod and fluidly connected to the lock-pin holes, for supplying and draining a pressurized oil to and from the lock-pin holes, at least one oil path among the at least two oil paths continuing to be pressurized, and at least one remaining oil path among the at least two oil paths continuing to be drained when engine loads are maintained in one of low, intermediate and low loads, pressurizing and draining of the oil paths being exchanged when the engine loads change from one of low, intermediate and high loads to another load.

2. The device according to claim 1, wherein the locking positions of the at least two groups include (a) a high compression ratio position where a thickest wall portion of the eccentric bearing is positioned at its lowest position with respect to a rotational axis of the eccentric bearing and (b) a low compression ratio position where a thinnest wall portion of the eccentric bearing is positioned at its lowest position with respect to the rotational axis of the eccentric bearing.

3. The device according to claim 1, wherein the at least two groups each have one guide groove, the guide grooves being defined in a radially outer portion of the eccentric bearing, initiating at the lock holes and extending in a circumferential direction of the eccentric bearing in directions away from the lock holes, the guide grooves operating as at least one portion of the at least one connecting oil groove.

4. The device according to claim 3, wherein
   (a) the number of the groups is two where the lock-pins, the lock-pin holes, the lock holes and the guide grooves are each provided by twos in number;
   (b) axes of the lock-pins, axes of the lock-pin holes, axes of the lock holes and axes of the guide grooves are included in a single common plane perpendicular to the axis of the small end hole of the connecting rod;
   (c) the lock-pin holes are offset from each other in a circumferential direction of the small end hole of the connecting rod; and
   (d) diameters of the lock-pins, the lock-pin holes and the lock holes and widths of the guide grooves are determined such that those of one of the two groups are different in dimension from those of the other of the two groups.

5. The device according to claim 4, wherein
   (a) one of the lock-pin holes extends perpendicularly to the other of the lock-pin holes, and
   (b) one of the lock holes is positioned at a thickest wall portion of the eccentric bearing and the other of the lock holes is positioned at an intermediate thickness wall portion of the eccentric bearing in a circumferential direction of the eccentric bearing.

6. The device according to claim 4, wherein one of the guide grooves having a width smaller than a width of the other of the guide grooves extends between the two lock holes in the circumferential direction of the eccentric bearing.

7. The device according to claim 3, wherein
   (a) the number of the groups is three where the lock-pins, the lock-pin holes, the lock holes and the guide grooves are each provided by threes in number; and
   (b) the lock-pins, the lock-pin holes, the lock holes and the guide grooves are included in planes perpendicular to the axis of the small end hole of the connecting rod such that axes of one lock-pin, one lock-pin hole, one lock hole and one guide groove grouped in one group among the groups are included in one common plane and such that one plane corresponding to one group is offset from another plane corresponding to another group in an axial direction of the small end hole of the connecting rod.

8. The device according to claim 7, wherein
   (a) axes of two lock-pin holes among the three lock-pin holes are included in a common plane including the axis of the small end hole of the connecting rod and a third lock-pin hole among the three lock-pin holes extends perpendicularly to the two lock-pin holes; and
   (b) axes of two lock holes among the three lock holes are included in a common plane including the axis of the eccentric bearing and a third lock hole among the three lock holes extends perpendicularly to the two lock holes.

9. The device according to claim 8, wherein the third lock hole is positioned at a thickest wall portion of the eccentric bearing and the two lock holes having their axes included in the common plane including the axis of the eccentric bearing are positioned at an intermediate thickness wall portion of the eccentric bearing.

10. The device according to claim 8, wherein the at least one connecting oil groove includes an axially extending oil groove which extends between the two lock holes having their axes included in the common plane including the axis of the eccentric bearing, the guide groove initiating at the third lock hole being fluidly connected to the axially extending oil groove.

11. The device according to claim 3, wherein
    (a) the number of the groups is three where the lock-pins, the lock-pin holes, the lock holes and the guide grooves are each provided by threes in number;
    (b) axes of the lock-pins, axes of the lock-pin holes, axes of the lock holes and axes of the guide grooves are included in a single common plane perpendicular to the axis of the small end hole of the connecting rod;
    (c) the lock-pin holes are offset from each other in a circumferential direction of the small end hole of the connecting rod; and
    (d) diameters of the lock-pins, the lock-pin holes and the lock holes and widths of the guide grooves are determined such that those of one group among the three groups are different in dimension from those of the remaining two groups among the three groups.

12. The device according to claim 11, wherein diameters of one lock-pi, one lock-pin hole and one lock hole and a width of one guide groove of one group of the remaining two groups are the same in dimension as those of the other group of the remaining two groups.

13. The device according to claim 12, wherein
    (a) one lock-pin hole among the three lock-pin holes extends in an axial direction of the connecting rod, another lock-pin hole among the three lock-pin holes extends perpendicularly to the axis of the connecting rod, and a third lock-pin hole among the three lock-pin holes extends in the direction perpendicular to the axis of the connecting rod and opposite to the another lock-pin hole; and
    (b) one lock hole among the three lock holes is positioned at a thickest wall portion of the eccentric bearing and another lock hole among the three lock holes is offset from the one lock hole in the circumferential direction of the eccentric bearing, and a third lock hole among the three lock holes is positioned diametrically opposite to the another lock hole.

14. The device according to claim 12, wherein the oil paths defined in the connecting rod and fluidly connected to the lock-pin holes grouped in the remaining two groups are formed partially in common in the connecting rod.

15. The device according to claim 12, wherein the oil paths defined in the connecting rod and fluidly connected to the lock-pin holes grouped in the remaining two groups are formed independent of each other in the connecting rod.

16. The device according to claim 11, wherein diameters of one lock-pin, one lock-pin hole and one lock hole and a width of one guide groove of one group of the remaining two groups are different in dimension from those of the other group of the remaining two groups.

17. The device according to claim 16, wherein
    (a) one lock-pin hole among the three lock-pin holes extends in an axial direction of the connecting rod, another lock-pin hole among the three lock-pin holes extends obliquely with respect to the axis of the connecting rod, and a third lock-pin hole among the three lock-pin holes extends in the direction oblique with respect to the axis of the connecting rod and opposite to the another lock-pin hole; and (b) one lock hole among the three lock holes is positioned at a thickest wall portion of the eccentric bearing and another lock hole among the three lock holes is offset from the one lock hole in the circumferential direction of the eccentric bearing, and a third lock hole among the three lock holes is positioned diametrically opposite to the another lock hole.

18. The device according to claim 16, wherein the oil paths defined in the connecting rod and fluidly connected to the lock-pin holes grouped in the remaining two groups are formed independent of each other in the connecting rod.

* * * * *